United States Patent [19]

Eichhorn

[11] Patent Number: 5,535,585
[45] Date of Patent: Jul. 16, 1996

[54] SLOTTED EXHAUST LINER

[76] Inventor: Gunther Eichhorn, 6136 Lucerne St., Palm Beach Gardens, Fla. 33418

[21] Appl. No.: 354,928

[22] Filed: Dec. 13, 1994

[51] Int. Cl.⁶ ................................. F23R 3/60; F02C 7/28
[52] U.S. Cl. .............................. 60/39.32; 60/752
[58] Field of Search .................... 60/752, 757, 39.32, 60/39.31, 755, 754

[56] References Cited

U.S. PATENT DOCUMENTS

| 2,544,538 | 3/1951 | Mahnken et al. | 60/752 |
| 2,938,333 | 5/1960 | Wetzler | 60/757 |
| 3,031,844 | 5/1962 | Tomolonius | 60/752 |
| 4,800,718 | 1/1989 | Zimmerman | 60/757 |
| 4,854,122 | 8/1989 | Belling | 60/39.32 |
| 4,887,663 | 12/1989 | Auxier et al. | 60/39.32 |
| 5,069,034 | 12/1991 | Jourdain et al. | 60/39.31 |
| 5,333,443 | 8/1994 | Halila | 60/39.31 |
| 5,337,583 | 8/1994 | Giles et al. | 60/752 |
| 5,363,643 | 11/1994 | Halila | 60/39.32 |

Primary Examiner—Timothy S. Thorpe

[57] ABSTRACT

A gas turbine exhaust liner contains air holes and a transverse slot to relieve thermally induced stresses on the liner, which is a catenary. The slot is covered by a seal, also a catenary, having two pieces that are joined in a way that allows them the expand with the liner so that the seal does not place thermal stresses across the liner.

3 Claims, 2 Drawing Sheets

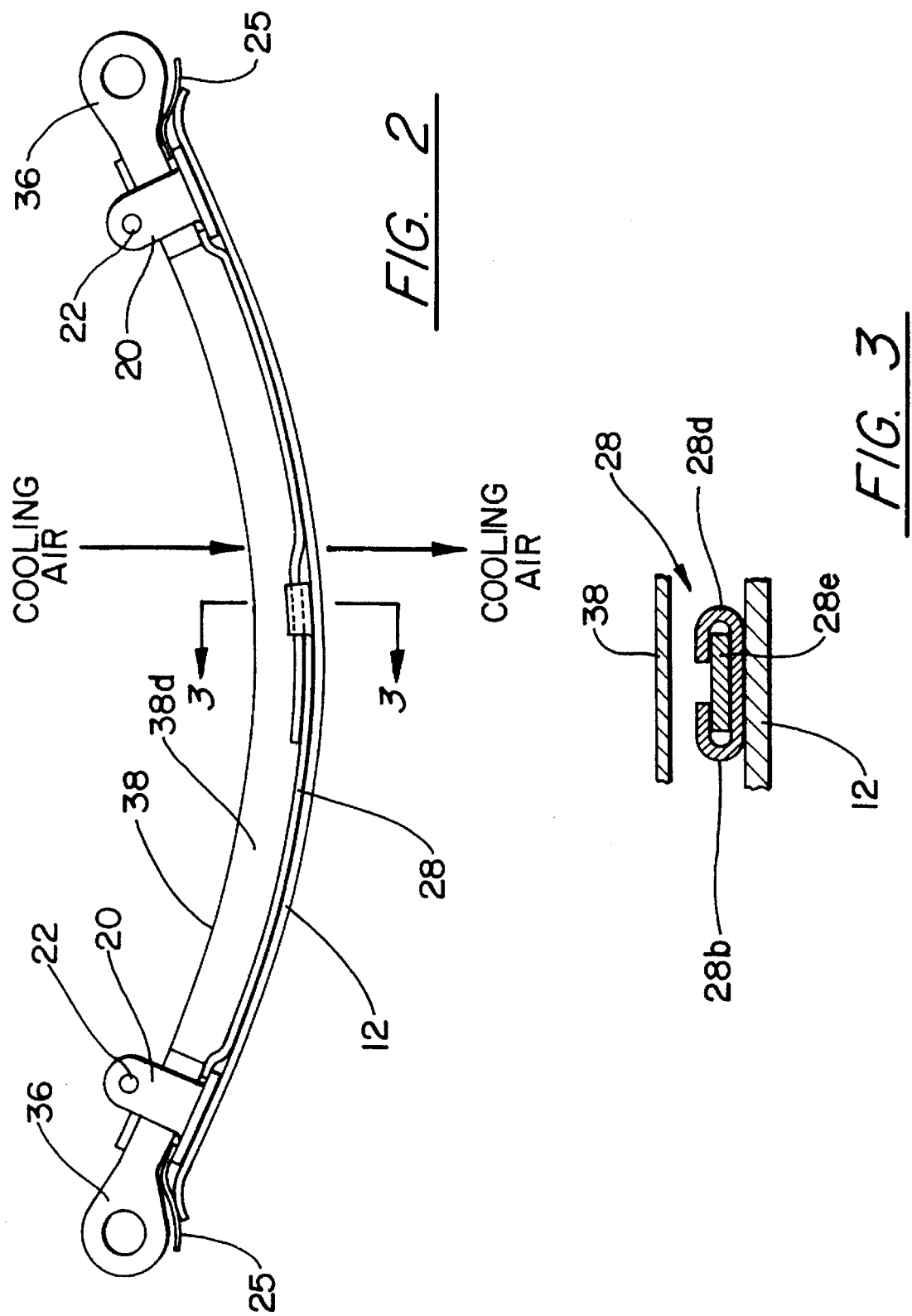

SLOTTED EXHAUST LINER

This invention was made under a U.S. Government contract giving the Government has rights herein.

TECHNICAL FIELD

This invention relates to the liners that are used in the exhaust nozzle of gas turbine engines.

BACKGROUND OF THE INVENTION

In gas turbine engines, barriers or walls, usually called "liners" are installed between the hot exhaust gas flow and surrounding engine material and components in the engine nozzle. For obvious reasons, these liners need to be light—fabricated from thin, but strong materials—to limit engine size and weight. Physical characteristics of this liners can limit their capacity to conduct heat away from local liner hot spots. Attempting to address this, techniques developed in the prior art generally focus on providing uniform liner cooling with forced air.

The liners are exposed to extremely high temperatures, creating unusual expansion problems that often cause liners to warp and buckle to some degree without fatiguing. Liners may contain air passages or metering ports to improve liner cooling, and physical changes, such as warping and buckling, may produce uneven cooling, leading to hot spots.

Typically the liner is cooled with air pumped from engine bypass flow and is directed through holes in a radiation shield into a passage between the liner and the shield. The cooling air exits into the exhaust through the holes in the liner, cooling the liner. U.S. Pat. No. 4,887,663, which is assigned to the assignee of this application, and U.S. Pat. No. 4,800,718 illustrate conventional schemes for constructing improved liners for gas turbine engines. The liner displayed in U.S. Pat. No. 4,800,718 is the type known to employ "louvers" in conjunction with air inlets and air dams. An air duct is shown that includes an up-stream duct wall that terminates in a downstream edge or lip. A second duct wall is spaced radially outward relative to the first surface lip and defines an elongated louver nozzle through which the cooling air that enters the supply orifices (metering holes) exits.

The liner sheet, typically a catenary supported at each end with a hinge pin for easy liner service and removal, may contain a slot extending substantially across the sheet within the field of the air holes, a design found to reduce heat induced mechanical stresses on the sheet. But a problem can arise if exhaust gas flows (reverse cooling flow in effect) through this slot into the passage between the liner and the shield, and it is that to which this invention is directed.

DISCLOSURE OF THE INVENTION

An object of the present invention is to provide a liner with a stress relief slot that does not permit reverse exhaust flow while accommodating the thermally induced changes in the liner and without imposing mechanical stresses on the liner.

According to the present invention, a self tensioning catenary seal is placed between the liner and the shield that is attached to the liner only at its attachment points to the shield. The seal presses against the slot. The seal has two catenary arms, each attached at opposite ends of the liner. Because the seal is attached in this manner it does not add mechanical stresses to the liner as the liner expands and contracts. One of the two arms captures the end of the other giving the seal the additional quality that it can thermal grow or contract without stressing the liner. The two pieces are catenaries, shaped to follow the interior contour of the liner and press against the slot, closing it.

A feature of the invention is that is effectively closes the slot, so that hot exhaust cannot pass through the slot to the space between the shield and the liner, but it does not impart any additional stresses across the liner as the liner expands and contracts.

Other objects, benefits and features of the invention will be apparent from the following discussion of one or more embodiments.

BRIEF DESCRIPTION OF THE DRAWING

FIG. 2 is a plan view of the cooled liner shown in FIG. 1.

FIG. 3 is a section along line 3—3 in FIG. 2.

DETAILED DESCRIPTION OF THE INVENTION

Figure 1:
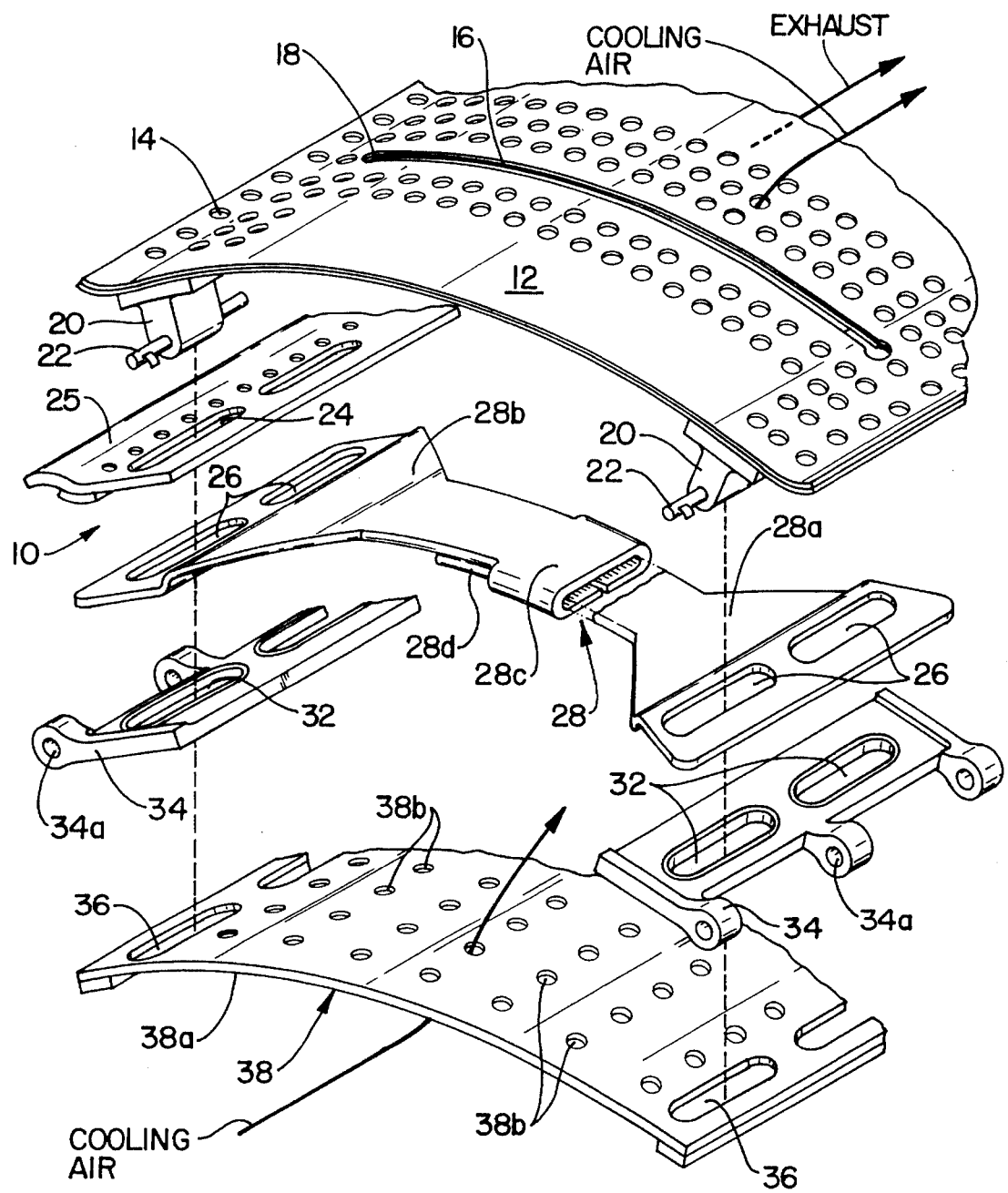
FIG. 1 is an exploded perspective view showing a removable cooled liner panel embodying the present invention.

Referring to FIG. 1, a typical cooled liner panel 10 is shown. First, it should be observed that the liner 12 is a catenary containing a plurality of spaced apart cooling holes 14, and that a slot 16 extends across (transversely) the liner between two holes 18. The slot provides strain relief as the liner, which is exposed to hot exhaust, expands. The liner contains bosses 20, which receive removable pins 22. To assemble the panel 10, the boss 20 extends through the aperture 24 in an end seal 25 and through apertures 26 in a seal 30 for the slot 16. After passing through the apertures 26, the boss is extended through apertures 32 in a hinge or toggle 34 and finally through an aperture 36 in a heat shield 38. Cooling air is applied to the lower side 38a of the heat shield 38, flowing through holes 38b to the panel interior 38c and from there through the holes 14 in the liner. The toggle 34 is used so that the entire panel can be easily removed from an exhaust nozzle assembly by removing a clevis pin (not shown) from the hole 34a. The pin 22 is inserted through the boss after it passed through the aperture 36; in this way, the liner 12, side seal 25, slot seal 28 and shield 38 are clamped together.

The seal 28, it is also a cantenary, but it has two sections or pieces 28a, 28b, each individually attached to one side of the liner through one of the bosses 20. When the bosses 20 are pinned, the two section are forced against the liner, closing the slot 16, a characteristic more easily seen in shown in FIG. 2, which shows a plan view of the assembled panel. The end 28c of the seal section 28b is bent to form a flat guide 28d for the end 28e of the other section 28a, allowing that section to slide in the guide transversely holding it place against the liner 12 with section 12b. The effect is that the seal can grow transversely with the liner while being held firmly against the liner, closing off the slot 16. As a consequence, the seal 28, which is only attached at the bosses 20, does not place any mechanical stresses across the liner as the liner grows; yet the slot 16 remains sealed.

Aided by the foregoing explanation, one of ordinary skill in the art may be able to make modifications, in whole or in part, to a described embodiment of the invention without departing from the invention's true scope and spirit.

I claim:

1. A liner assembly for a gas turbine engine comprising a catenary liner having a plurality of cooling holes and supported at opposite liner ends with a slot extending between said liner ends, characterized by: an elongated catenary seal having two seal ends, each seal end attached to one of said liner ends, said seal extending along an interior concave surface of the liner in contact with said concave surface to cover said slot, said seal comprising two pieces, a second seal end of one piece containing means for capturing a second seal end of the other piece and for allowing said second seal ends to slide relative to each other such that the ends of said seal can move apart without creating tension between said seal ends through the seal.

2. The liner described in claim 1, further characterized in that: said means for capturing comprises two arms that are bent to form a slot.

3. The liner described in claim 3 wherein the liner contains a boss for receiving a liner retainer pin by which the liner is attached to bracket on a shield and further characterized in that: the seal contains a slot no receive said boss, by which said two seal ends are attached to the liner.

* * * * *